United States Patent [19]
Allen

[11] Patent Number: 6,084,987
[45] Date of Patent: Jul. 4, 2000

[54] COLLABORATIVE JUDGEMENT IN STATISTICAL CODING

[75] Inventor: James D. Allen, J. Uthai Thani, Thailand

[73] Assignees: Ricoh Company, Ltd., Tokyo, Japan; Ricoh Corporation, Menlo Park, Calif.

[21] Appl. No.: 09/094,211

[22] Filed: Jun. 9, 1998

[51] Int. Cl.[7] .................................................. G06K 9/00
[52] U.S. Cl. ........................................ 382/239; 382/224
[58] Field of Search .................................... 382/232, 233, 382/234, 235, 236, 237, 238, 239, 240, 241, 242, 243, 244, 245, 246, 247, 248, 249, 250, 251, 252, 253, 224; 435/6; 341/107.51; 235/494, 462.01; 386/112, 111, 125; 283/70

[56] References Cited

U.S. PATENT DOCUMENTS

| | | | |
|---|---|---|---|
| 5,381,145 | 1/1995 | Allen et al. | 341/107 |
| 5,850,482 | 12/1998 | Meany et al. | 382/232 |

OTHER PUBLICATIONS

Kris Popat and Rosalind W. Picard, "Cluster–Based Probability Model and It's Application to Image and Texture Processing," Feb. 1997, pp. 268–284, vol. 6, No. 2, No Place of Publication.

Kris Popat, et al. *Exaggerated consensus in lossless image compression*, MIT Media Laboratory, Nov. 1994, 6 pages, No Page #, No Place of Publication.

*Primary Examiner*—Bijan Tadayon
*Attorney, Agent, or Firm*—Blakely, Sokoloff, Taylor & Zafman LLP

[57] ABSTRACT

A method of generating a collaborative judgment for use in coding a symbol is described. One method includes generating multiple probability estimates for a symbol to be coded, selecting an exaggeration exponent and weighting information indicative of weighting between the probability estimates, and combining the probability estimates into the collaborative probability estimate based on an exaggeration function using the exaggeration exponent and the weighting information.

34 Claims, 4 Drawing Sheets

COLLABORATIVE JUDGEMENT IN STATISTICAL CODING

FIELD OF THE INVENTION

The present invention relates to the field of statistical coding; more particularly, the present invention relates to combining multiple probability estimates into a collaborative judgment for coding information.

BACKGROUND OF THE INVENTION

Statistical coding is an example of a coding technique that is a useful tool for storing and transmitting large amounts of data. For example, the time required to transmit an image, such as a facsimile transmission of a document, is reduced when compression is used to decrease the number of bits required to recreate the image.

In statistical coding, one develops a probability estimate from conditioning data. Typically, the set of all coding decisions is partitioned based on the conditioning data and statistics are developed for each such partition member, or context. For example, coding decisions might be conditioned on neighboring pixels. An example of such a scheme is shown in FIG. 1A and 1B. Referring to FIG. 1A, 10 prior pixels are used to condition pixel 101 (identified by the "?"). If each pixel has two possible values, there are 1024 different combinations that are possible for the 10 pixels. Thus, there are 1024 different contexts that can be used to condition the coding of pixel 101. Referring to FIG. 1B, a lookup table (LUT) 102 contains a probability estimate of how likely a pixel is to be in its most probable state (or least probable state) for each possible combination of values for the 10 pixels. Therefore, LUT 102 contains 1024 context bins, each context bin having a probability estimate associated with it. LUT 102 receives the 10 prior pixels at its input 103 and outputs probability estimate 104 in response thereto.

Two or more partitionings may be made to obtain two or more probability estimates for the same pixel. For example, one estimate might correspond to pixels neighboring towards the left of the pixel being conditioned and another estimate might correspond to pixels neighboring above the pixel being conditioned. The two estimates are combined into a single probability estimate (i.e., a collaborative judgment). FIG. 2 is a block diagram illustrating such a system.

Referring to FIG. 2, two probability estimates are conditioned on two different groups of 8 pixels. One of the probability estimates, $P_1$, indicating the probability that pixel 200 is in its most probable state, is output from LUT 201 based on the values of the 8 pixels shown in pixel group 203. The other probability estimate, $P_2$, indicating the probability that pixel 200 is in its most probable state, is output from LUT 202 based on the values of the 8 pixels shown in pixel group 204. Because pixel groups 203 and 204 have 5 common pixels, 5 of the inputs to LUTs 201 and 202 are the same and are shared. The two probability estimates are combined by combining block 205 to generate a collaborative probability estimate 206.

The main advantage of using a collaborative judgment is that smaller conditioning partitions can be used. The use of smaller conditioning partitions implies faster adaptation because contexts are not "diluted" and the model is not "overfitted" with too many contexts. Smaller partitions also imply less hardware to store the probability estimates. In other words, the memory for storing the statistics and context (i.e., the context memory) may be smaller.

In the case where two probability estimates are being combined, one might assume that an average of the two probability estimates would achieve the most accurate probability estimate. However, this simple combining technique is often only applicable when the conditioning upon which one of probability estimates is based is strongly related to the conditioning upon which the other probability estimate is based.

In the prior art, estimates are combined via the geometric mean of the odds and the result is exaggerated if there is a consensus. See Kris Popat and Rosalind W. Picard, "Exaggerated Consensus in Lossless Image Compression," In Proceedings of IEEE Int'l Conf of Image Processing, Vol. III, pgs. 846–850, November 1994. That is, when the probability estimates are both greater than 50% (i.e., there is a consensus) and the resulting combined probability estimate is greater than either of the two component probability estimates, the resulting probability estimate is said to be exaggerated.

In Popat-Picard, the collaborative judgment, referred to as $P_{NET}$, is calculated based on raw probability, referred to as Q, according to the following:

$$Q = \sqrt{A}/(1+\sqrt{A})$$

where A equals:

$$A = P_1 \cdot P_2/(1-P_1-P_2+P_1 P_2)$$

$P_{NET}$ is generated according to the following equation:

$$P_{NET} = Q^{Y(B)}/(Q^{Y(B)} + (1-Q)^{Y(B)})$$

where $P_1$ and $P_2$ are the two probability estimates and B measures the divergence between probability estimates $P_1$ and $P_2$. The value $Y(B)$ is an exaggeration exponent implemented with a table-lookup developed from training images. The function mapping consensus to an exaggeration exponent is set by training using an ensemble of test data.

SUMMARY OF THE INVENTION

A method of generating a collaborative judgment for use in coding a symbol is described. One embodiment of the method comprises generating multiple probability estimates for a symbol to be coded, selecting an exaggeration exponent and weighting information indicative of weighting between the probability estimates, and combining the probability estimates into the collaborative probability estimate based on an exaggeration function using the exaggeration exponent and the weighting information.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
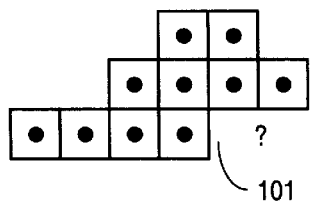
FIGS. 1A and 1B illustrate a prior art partitioning scheme.
Figure 1B:
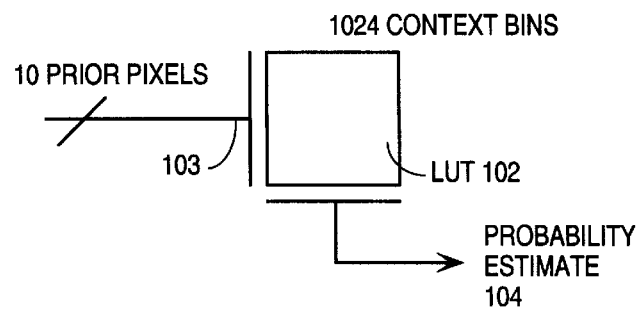
Figure 2:
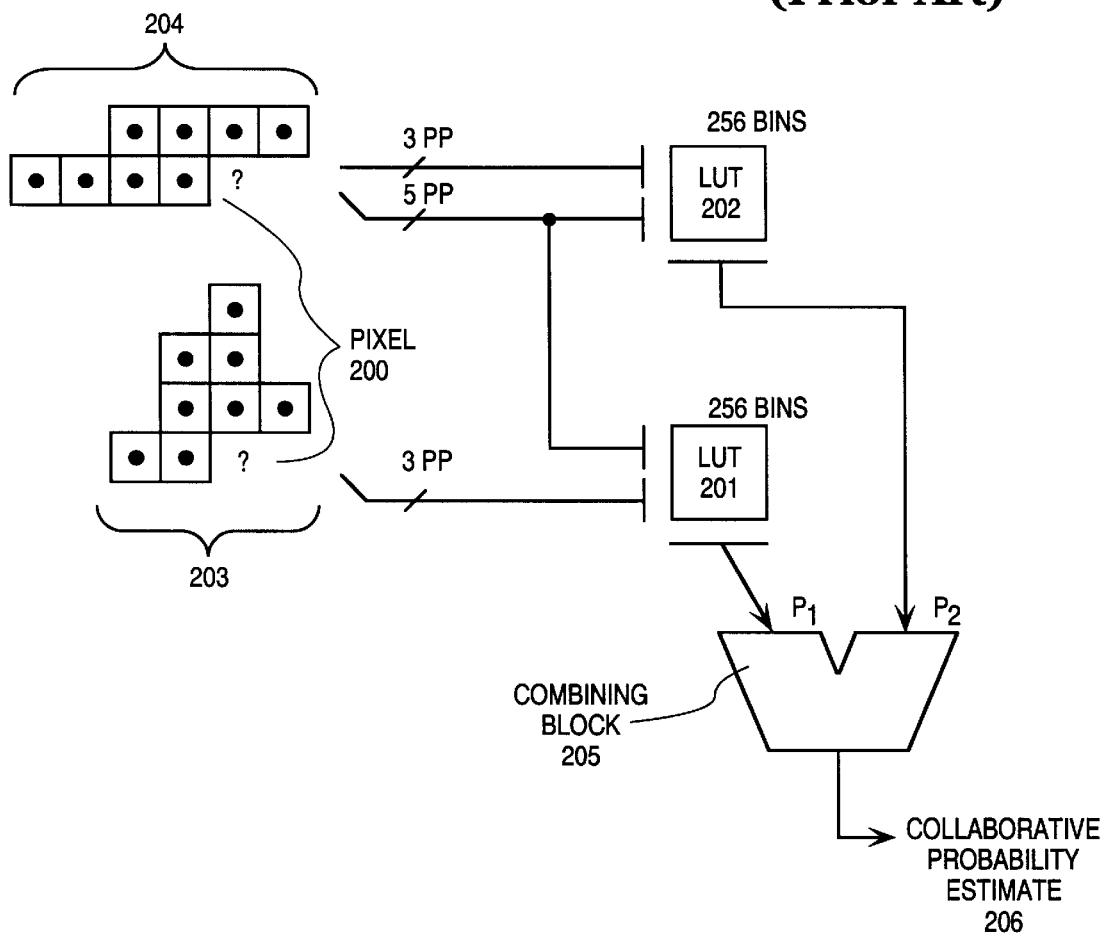
FIG. 2 is a block diagram of a system in which two context models are combined.

A statistical coding scheme using a collaboration judgment is described. In the following description, numerous details are set forth, such as, for example, numbers of probability estimates, contexts, bits and memories, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions described below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also as discussed below, the present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMS, magnetic or optical cards, or any type of media suitable for storing electronic instructions, and each coupled to a computer system bus. The algorithms presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview

A method and apparatus for generating a collaborative judgment for use in coding a symbol is described. The symbol may comprise a bit, decision, token or other datum that is to undergo coding.

A In one embodiment, a method for generating a collaborative judgment includes generating multiple probability estimates for each symbol that is to be coded. These probability estimates may represent low-order conditional probability distributions. These probability estimates are combined to create a single higher-order estimate, which is based on their agreement (i.e., their consensus). For instance, if graphs of two probability distributions have the same shape, the combination of individual probability estimates may result in an exaggeration of the shape. Thus, a collaborative judgment is created by combining multiple probability estimates where the combination results in an exaggeration of the probability estimates of any individual one of the probability estimates.

In one embodiment, the collaboration judgment is the result of applying a function to probability estimates. This function uses an exaggeration exponent and weighting information which are selected based on the probability estimates. The weighting information is indicative of the weighting between the probability estimates. In one embodiment, the weighting information may comprise an efficiency weight that may indicate the extent to which each of the probability estimates influences the collaborative probability estimate. In another embodiment, the weighting information may comprise a set of weights, each weight associated with one of the probability estimates. The exaggeration exponent indirectly measures the degree of independence among the conditioning data used by the separate probability estimates.

The probability estimates are then combined into a collaborative probability estimate based on the exaggeration function using the exaggeration exponent and the weighting information.

Figure 3:
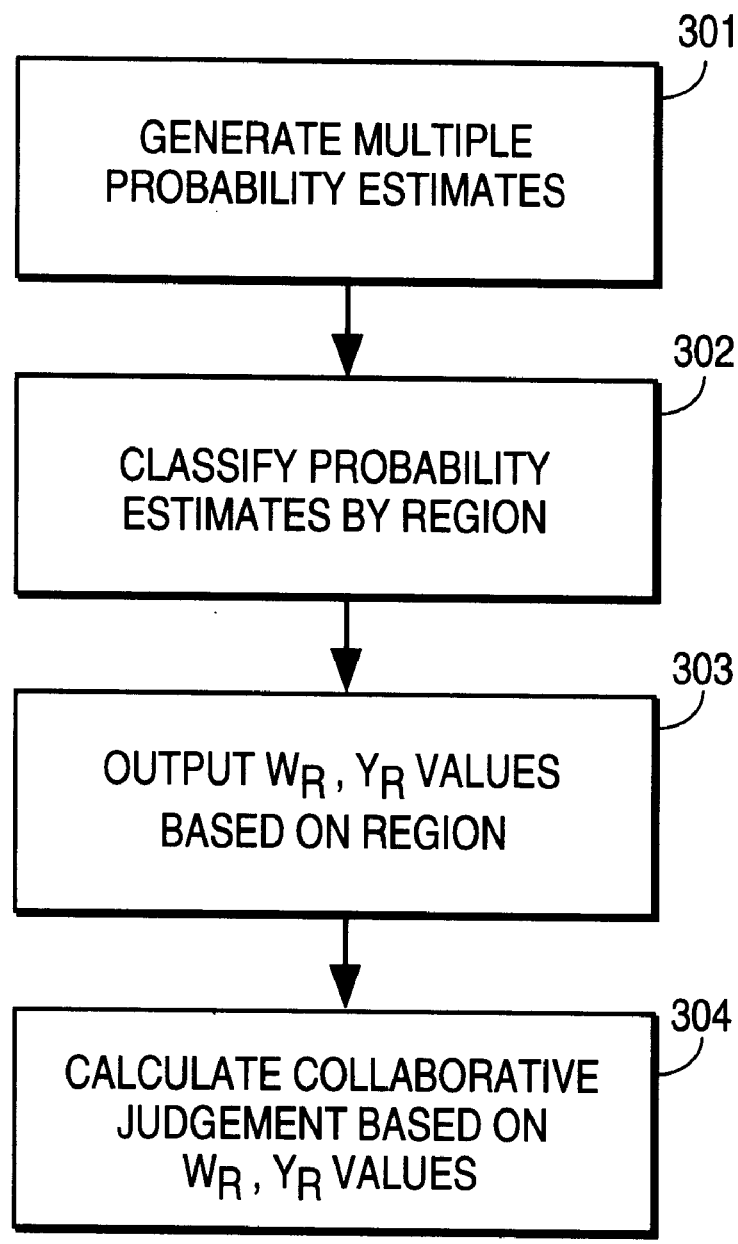
FIG. 3 is a flow diagram of one embodiment of a process of creating a collaborative probability estimate.

FIG. 3 illustrates one embodiment of the process for combining multiple probability estimates into a collaborative probability estimate. The process set forth in FIG. 3 calculates the collaborative probability estimate using a function (e.g., an equation) that includes an exaggeration exponent and an efficiency weight.

Processing logic may perform the combining process. The processing logic may comprise software such as, for example, that which runs on a general purpose or dedicated processing device or computer system, hardware such as, for example, dedicated logic or circuitry, or a combination of both.

Referring to FIG. 3, the process begins with processing logic generating multiple probability estimates for each symbol to be coded (processing block 301). In the case where the symbol comprises a decision, each probability estimate may be generated in response to a context. That is, data being coded is input into multiple context models. Each context model translates the input data into a set or sequence of binary decisions and provides a context bin for each decision. Both the sequence of binary decisions and their associated context bins are output to a probability estimation module, which generates a probability estimate for each binary decision in a manner well known in the art.

In the present invention, the context models are different. In one embodiment, neighboring pixels are used as the context to condition the coding of a decision. A predetermined number of pixels may be used. For instance, in one embodiment, ten neighboring pixels are used as one context, while other contexts may be formed by using different groups or numbers of neighboring pixels. In one embodiment, when an individual bit of a pixel is being coded, only those bits in the same bit position within the neighboring pixels forming the context are used to condition that individual bit. Note that in other embodiments, other bits within one or more of the pixels may form the context for a particular bit (e.g., decision).

Other context models may be employed to generate contexts that result in a probability estimate being created when input to a probability estimation machine.

In one embodiment, two probability estimates are generated, one for each context. These are referred to herein as probability estimates $P_1$ and $P_2$. The number of probability estimates generated may instead be three or more.

Figure 4:
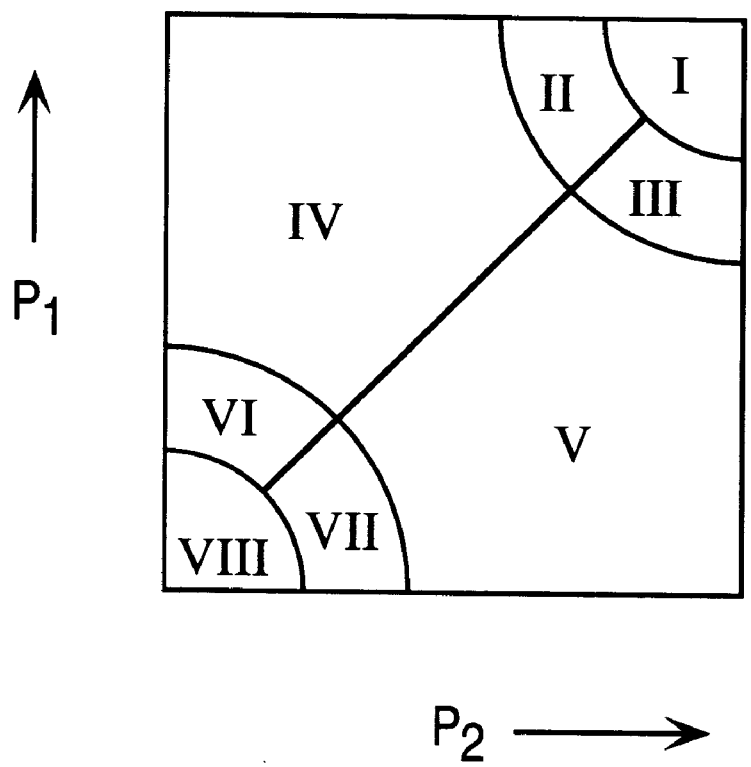
FIG. 4 illustrates a two-dimensional map having individual regions associated with different pairs of probability estimates.

After the probability estimates have been generated, processing logic classifies them into a region R (processing block 302). FIG. 4 illustrates one embodiment of a two-dimensional (2-D) consensus map 400 having regions I–VIII. One of the regions in map 400 is selected based on the values of probability estimates $P_1$ and $P_2$. Each region is associated with two parameters, an efficiency weight, $W_R$, and an exaggeration exponent, $Y_R$. The efficiency weight is indicative of the weight given to each of the probability estimations with respect to each other. In one embodiment, the probability estimations are given different weights. In the case where only two probability estimates are being combined, a single weight value can be used to define which of the probability estimates is to be given a greater weight in the determining what the collaborative probability estimate should be. Note that if more than two probability estimates are being combined, additional weights W may be necessary to indicate the different weights for each probability estimation. In one embodiment, $W_R$ is initially 0.5 and $Y_R$ is initially 1.0 and these parameters are updateable.

The selection of a region R based on the probability estimates results in the values for $W_R$ and $Y_R$ being output by the processing logic (processing block 303). In one embodiment, the 2-D consensus map comprises a lookup table (LUT) that stores $W_R$ and $Y_R$ values for each region.

After classifying the two probability estimates to obtain the $W_R$ and $Y_R$ values, processing logic calculates the collaborative judgment $P_{NET}$ In one embodiment, $P_{NET}$ is calculated according to the following equations (processing block 304). For brevity of exposition assume that the coded decision was true. If not, replace each P with (1−P) et cetera:

$$Q = P_2 + W_R(P_1 - P_2)$$

$$P_{NET} = Q^{Y_R}/(Q^{Y_R} + (1-Q)^{Y_R})$$

Note that this combination of probability estimates is based on an arithmetic mean probability, instead of the geometric mean odds.

After calculating the collaborative judgment, processing logic updates parameters $W_R$, $Y_R$ (processing block 305). The updates may be performed for each new symbol (e.g., decision, etc.) that is coded. Thus, the updates may occur in real-time (e.g., on-line).

In one embodiment, since the cost of encoding a true decision of probability $P_{NET}$ is -log $P_{NET}$, processing logic updates these parameters using gradient descent update rules. The gradient descent update rules may update according to the following equations:

$$W_R \leftarrow W_R + \delta_W \frac{P\log - P_{NET}}{2W} = W_R + \delta_W \frac{P_1 - P_2}{Q} \cdot \frac{Y_R(1-P_{NET})}{1-Q}$$

$$Y_R \leftarrow Y_R + \delta_Y(1 - P_{NET})\log(Q/(1-Q))$$

where $\delta_w$, $\delta_y$ are adaption rates. The value for each adaption rate which is likely to give best compression performance is likely to be near 0.01 in most applications or near 0.05 when data sets are small or highly non-stationary. Thus, the adaption rates may be selected based on desired performance or the data itself. It would be readily apparent to one skilled in the art as to how to experiment with various values to achieve good performance.

If $Y_R = 1$, the former becomes $$W \leftarrow W + \delta_w \frac{P_1 - P_2}{Q}$$

Thus, the $W_R$ and $Y_R$ values are set adaptively in real-time, region-by-region. Likewise, this implies that the $W_R$ and $Y_R$ values are learned in real-time as well.

Note that the $W_R$ and $Y_R$ values for each region may be set off-line. The offline update of the $W_R$ and $Y_R$ values may be performed by partitioning the region of possible combinations of probability estimates and using one or more test images to identify the combination of $W_R$ and $Y_R$ values that results in the lowest average bit rate. Once that combination of values is identified, those values are assigned to the region.

For coding, the combined probability estimate may be used by a coder to code information. In one embodiment, the coder may include a bit stream generator that receives the collaborative probability estimate along with the determination of whether a binary decision (result) is or is not in its most probable state (i.e., whether the decision corresponds to the most probable symbol (MPS). The bit stream generator receives the probability estimate and the determination of whether or not the binary decision was likely as inputs and produces a compressed data stream, outputting zero or more bits, to represent the original input data. The coder may also generate code state data which may be used to code subsequent data.

During decoding, the same processes of generating a collaborative probability estimate may be used. That is, multiple probability estimates will be generated based on multiple contexts and combined in the same manner as described above. Intone embodiment, a coder such as one with a bit stream generator returns a bit representing whether a binary decision (i.e., the event) is in its most probable state. The combined probability estimate is generated based on the received bit and returns a result to the context model. The context model receives the result and uses it to generate the original data and update the context bin for the next binary decision.

The process of generating the collaborative judgment may be useful in lossless image compression as well other image processing applications, such as lossy compression, restoration, segmentation, and classification. Lossy coding involves coding that results in the loss of information, such that there is no guarantee of perfect reconstruction of the original data. In lossless compression, all the information is retained and the data is compressed in a manner which allows for perfect reconstruction. Other potential areas of application include multi-sensor integration and decision-making based on accumulated evidence.

Note that other techniques to combine multiple probability estimates may use some or all parts of the process described herein.

Figure 5:
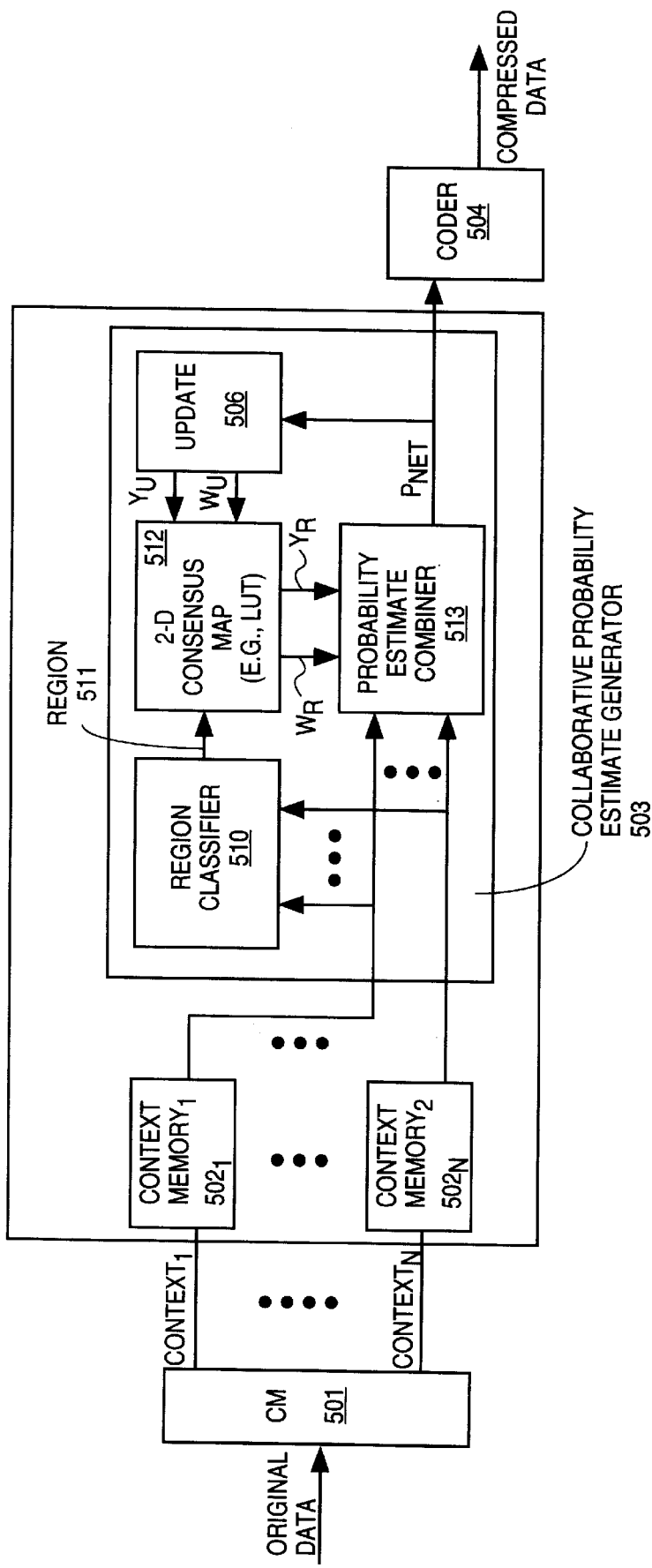
FIG. 5 is a block diagram of one embodiment of a coding system.

FIG. 5 is a block diagram of one embodiment of a coding system having a collaborative probability estimate generator. Referring to FIG. 5, a context model 501 generates multiple contexts, context$_1$-context$_N$, convert each input data bit into a decision. As discussed above, the contexts may be two different groups of pixels. Each context is used to address one or more memories (e.g., lookup tables), such as context memories 502$_1$–502$_N$, containing probability estimates for each context bin. In response to the contexts, memories 502$_1$–502$_N$ output probability estimates.

In one embodiment, the two probability estimates are conditioned on two different groups of 8 pixels. One of the probability estimates, $P_1$, indicating the probability that a pixel is in its most probable state, is output from a LUT based on the values of 8 pixels. The other probability estimate, $P_2$, indicating the probability that a pixel is in its most probable state, is output from the LUT based on the values of 8 different pixels. If the two pixel groups have common pixels, some of the inputs to the LUTs may be the same.

Collaborative probability estimate generator 503 combines the two probability estimates to generate a collaborative probability estimate 506.

In one embodiment, probability estimate generator 503 comprises a region classifier 510 that receives the probability estimates and produces region identifier 511. A 2-D consensus map (e.g., LUT) 512 receives region identifier 511 and outputs the $W_R$ and $Y_R$ values. Note that in other embodiments, the probability estimates may be used as inputs to the 2-D consensus map directly. A probability estimate combiner 513 uses the $W_R$ and $Y_R$ values to combine the probability estimates as described above and outputs the result $P_{NET}$. The $P_{NET}$ value is also sent to update module 506, which updates $W_R$ and $Y_R$ values for the region, such as described above.

Coder 504 receives the $P_{NET}$ and codes the data using it. The data may be decisions or indications of whether or not the binary decision was likely as inputs. The output of coder is a compressed data stream, outputting output bits, to represent the original input data. The coder may employ any coding technique that is well-known in the art (e.g., statistical coding, etc.). The coder may generate zero or more output bits along with code state data (not shown), which may be used for coding subsequent data.

The blocks (or units) in FIG. 5 may be implemented in software, hardware, or a combination of both as described above.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method of compression/decompression has been described.

I claim:

1. A method of generating a collaborative judgment for use in coding a symbol, said method comprising:
   generating a plurality of probability estimates for the symbol to be coded;
   selecting an exaggeration exponent and weighting information indicative of weighting between the plurality of probability estimates; and
   combining the plurality of probability estimates into the collaborative probability estimate based on an exaggeration function using the exaggeration exponent and the weighting information.

2. The method defined in claim 1 further comprising classifying the plurality of probability estimates by region of a multi-region map.

3. The method defined in claim 1 wherein selecting the exaggeration exponent and weighting information comprises selecting a region of a two-dimensional map based on the probability estimates and outputting the exaggeration exponent and the weighting information based on the region selected.

4. The method defined in claim 1 further comprising updating the weighting information.

5. The method defined in claim 4 wherein updating the weighting information comprises adjusting the weighting information on-line while coding information.

6. The method defined in claim 4 wherein updating the weighting information is by gradient descent.

7. The method defined in claim 1 further comprising updating the exaggeration exponent.

8. The method defined in claim 7 wherein updating the exaggeration exponent comprises adjusting the exaggeration exponent on-line while coding information.

9. The method defined in claim 7 wherein updating the exaggeration exponent is by gradient descent.

10. The method defined in claim 1 wherein the weighting information comprises an efficiency weight.

11. A method of coding comprising:
    generating a plurality of probability estimates for a symbol to be coded;
    combining the plurality of probability estimates into a collaborative probability estimate $P_{NET}$ according to $Q = P_2 + W_R(P_1 - P_2)$ $P_{NET} = Q^{YR}/(Q^{YR} + (1-Q)^{YR})$ using an exaggeration exponent $Y_R$ and a weight $W_R$ selected based on the plurality of probability estimates; and
    generating output in response to the symbol and the collaborative probability estimate.

12. The method defined in claim 11 wherein generating output comprises generating code state data.

13. An apparatus for generating a collaborative judgment for use in coding a symbol, said apparatus comprising:
    means for generating a plurality of probability estimates for the symbol to be coded;
    means for selecting an exaggeration exponent and weighting information indicative of weighting between the plurality of probability estimates; and
    means for combining the plurality of probability estimates into the collaborative probability estimate based on an exaggeration function using the exaggeration exponent and the weighting information.

14. The apparatus defined in claim 13 further comprising means for classifying the plurality of probability estimates by region of a multi-region map.

15. The apparatus defined in claim 13 wherein the means for selecting selects a region of a two-dimensional map based on the probability estimates and outputs the exaggeration exponent and the weighting information based on the region selected.

16. The apparatus defined in claim 13 further comprising means for updating the weighting information.

17. The apparatus defined in claim 16 wherein the means for updating adjusts the weighting information on-line while coding information.

18. The apparatus defined in claim 16 wherein the means for updating updates the efficiency weighting information by gradient descent.

19. The apparatus defined in claim 13 further comprising the means for updating the exaggeration exponent.

20. The apparatus defined in claim 19 wherein the means for updating adjusts the exaggeration exponent on-line while coding information.

21. The apparatus defined in claim 19 wherein the means for updating updates the exaggeration exponent by gradient descent.

22. A computer software product having a recordable medium storing instructions thereon, which when executed by a processing device, cause the processing device to:
generate a plurality of probability estimates for a symbol to be coded;
combine the plurality of probability estimates into a collaborative probability estimate $P_{NET}$ according to $$Q = P_2 + W_R(P_1 - P_2)$$

$$P_{NET} = Q^{Y_R}/(Q^{Y_R} + (1-Q)^{Y_R})$$

using an exaggeration exponent $Y_R$ and a weight $W_R$ selected based on the plurality of probability estimates; and
generate output in response to the symbol and the collaborative probability estimate.

23. The computer software product defined in claim 22 further comprising instructions which, when executed by the processing device, cause the processing device to classify the plurality of probability estimates by region of a multi-region map.

24. The computer software product defined in claim 22 further comprising instructions which, when executed by the processing device, cause the processing device to select and exaggeration exponent and weighting information indicative of weighting between the plurality of probability estimates.

25. The computer software product defined in claim 24 further comprising instructions which, when executed by the processing device, cause the processing device to select a region of a two-dimensional map based on the probability estimates and output the exaggeration exponent and the weighting information based on the region selected.

26. The computer software product defined in claim 22 further comprising instructions which, when executed by the processing device, cause the processing device to update the weighting information.

27. The computer software product defined in claim 26 further comprising instructions which, when executed by the processing device, cause the processing device adjust the weighting information on-line while coding information.

28. The computer software product defined in claim 26 wherein the update of the weighting information is by gradient descent.

29. The computer software product defined in claim 22 further comprising instructions which, when executed by the processing device, cause the processing device to update the exaggeration exponent.

30. The computer software product defined in claim 29 further comprising instructions which, when executed by the processing device, cause the processing device to adjust the exaggeration exponent on-line while coding information.

31. The computer software product defined in claim 29 wherein the update of the exaggeration exponent is by gradient descent.

32. The computer software product defined in claim 22 wherein the weighting information comprises an efficiency weight.

33. A collaborative probability estimate generator comprising:
a region classifier responsive to a plurality of probability estimates to generate a region indication;
a two-dimensional consensus map to generate an exaggeration exponent and weighting information indicative of weighting between the plurality of probability estimates in response to the region indication;
a probability estimate to combine the plurality of probability estimates into a collaborative of probability estimate based on an exaggeration function using the exaggeration exponent and the weighting information received from the two-dimensional consensus map.

34. The collaborative probability estimate generator defined in claim 33 further comprising an update unit responsive to the collaborative probability estimate to update the exaggeration exponent and weighting information based thereon.

* * * * *